Aug. 2, 1927.
J. SIMPSON ET AL
1,637,921
APPARATUS FOR MEASURING LINEAR DIMENSIONS
Filed Dec. 30, 1926
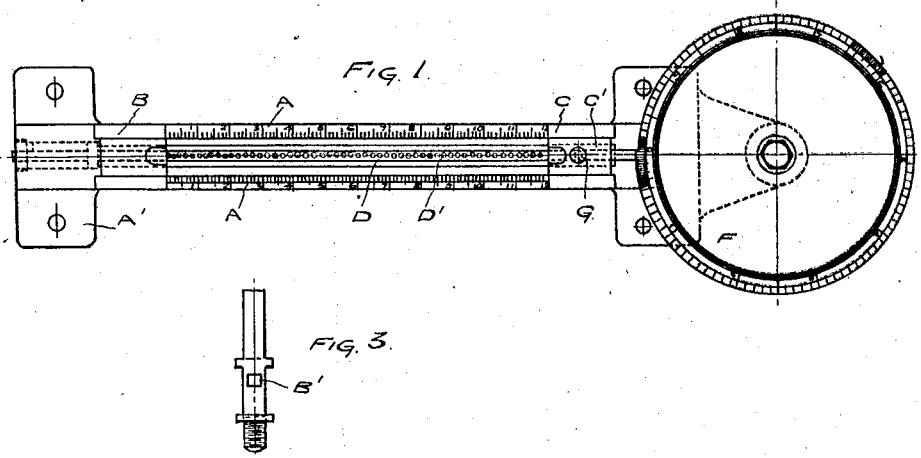
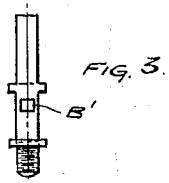
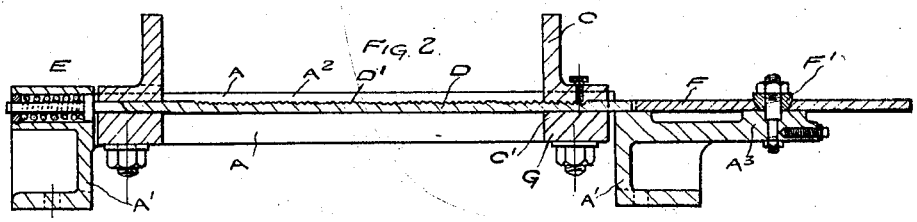
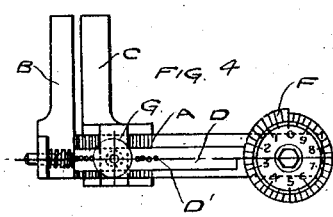
Inventors
James Simpson
and
John Glen
By B. Singer, Atty.

Patented Aug. 2, 1927.

1,637,921

UNITED STATES PATENT OFFICE.

JAMES SIMPSON, OF BELLSHILL, AND JOHN GLEN, OF COATBRIDGE, SCOTLAND.

APPARATUS FOR MEASURING LINEAR DIMENSIONS.

Application filed December 30, 1926, Serial No. 158,028, and in Great Britain October 31, 1925.

Our invention relates to improvements in measuring apparatus for quickly obtaining the length of any piece to a fine degree of accuracy of the type having a graduated bar or plate, suitably supported, on which the graduations are marked in any suitable standard measurements and on which graduated bar or plate are carried two jaws, one at each end, one being fixed to or stationary on the graduated bar or plate, and the other being adjustable or able to slide.

In order that our invention may be properly understood and readily carried into effect, we have hereunto appended two sheets of drawings, of which Figure 1 is a plan illustrating our invention.

Figure 2 is a sectional elevation of Figure 1.

Figure 3 is an end view of the jaw.

Figure 4 is a side view illustrating a modified form of the device.

Referring to the drawings, A is the graduated bar or plate, and A' is the base on which it is supported. B and C are the two jaws, B being stationary or fixed to the graduated bar or plate A and C being movable and capable of sliding along the graduated plate A. A sliding rod D passes through a hole B' and C² on each of the jaws B and C, respectively the said sliding rod D being supported on a slot A² in the graduated bar or plate A. One end of the sliding rod D bears against the spring E, while the other end bears against the evolute cam or graduated dial F. The bar D has countersunk recesses D'. The movable jaw C has an adjusting lock-screw G with a conical point G' for engagement with the recesses D' of the sliding bar D when being tightened up when the movable jaw C has been moved into the position which is desired.

The base A' is provided with an extension A³ on which the graduated dial F is carried.

Referring to Figure 4 of the drawings, B and C are the jaws, C being the movable one and B being the fixed jaw. The sliding bar D bears against the graduated dial or cam F, the latter being pivoted to the graduated bar or plate A and also to which graduated bar or plate A the fixed stationary jaw B is suitably attached. The movable jaw C is manually movable on the graduated bar or plate A and is provided with a lock screw G having a conical point which engages with the recesses D' on the bar D.

The modus operandi is as follows:—

The piece to be measured is held between the two jaws C and B, the adjustable jaw C being moved alone towards the piece until within a distance equal to less than one of the smallest graduations on the graduated bar or plate I. It is then locked in this position by the adjusting lock screw. The cam or graduated dial F is then turned part of a revolution until the adjustable jaw C on the sliding rod D is made to bear against the piece being measured. The dimension of the piece may then be read on the graduated bar or plate A, plus the figures on the cam or graduated dial F at the point on the dial F where it is in contact with the sliding rod D.

This apparatus is applicable for small sizes suitable for being carried about in the pocket.

Claims—

1. Measuring apparatus of the class described comprising a graduated bar having a longitudinal slot and provided with a jaw fixed relatively to said bar, a jaw movably mounted on said bar, a slidable member extending through said slot and also through bores with which said jaws are provided, a graduated evolute cam mounted for rotation and bearing against one end of said member, a spring active to keep said end of said member in contact with said cam, and means to fix said cam in adjusted position.

2. Measuring apparatus as claimed in claim 1, in which said sliding member is provided with recesses adjacent the graduations of the bar and pitched at distances corresponding to the smallest graduations on said bar.

3. Measuring apparatus as claimed in claim 1, in which said graduated bar is provided with an extension on which said cam is mounted.

In witness whereof we affix our signatures.

JAMES SIMPSON.
JOHN GLEN.